(12) United States Patent
Huang et al.

(10) Patent No.: US 8,148,834 B2
(45) Date of Patent: Apr. 3, 2012

(54) AIRCRAFT ENGINE STARTING/GENERATING SYSTEM AND METHOD OF CONTROL

(75) Inventors: Hao Huang, Troy, OH (US); Slobodan Gataric, Xenia, OH (US); David Dimitri Karipides, Casstown, OH (US); Xiaochuan Jia, Centerville, OH (US); Mohamed Abd Elkader Abbas, Dayton, OH (US)

(73) Assignee: General Electric Company, Schenectady, NY (US)

( * ) Notice: Subject to any disclaimer, the term of this patent is extended or adjusted under 35 U.S.C. 154(b) by 456 days.

(21) Appl. No.: 12/468,206

(22) Filed: May 19, 2009

(65) Prior Publication Data

US 2010/0295301 A1   Nov. 25, 2010

(51) Int. Cl.
 *F02N 11/04* (2006.01)
(52) U.S. Cl. .................. 290/31; 290/40 B; 290/40 C
(58) Field of Classification Search .............. 290/31, 290/40 B, 40 C
See application file for complete search history.

(56) References Cited

U.S. PATENT DOCUMENTS

| | | | |
|---|---|---|---|
| 4,481,459 A | 11/1984 | Mehl et al. | |
| 4,743,777 A * | 5/1988 | Shilling et al. | 290/46 |
| 4,939,411 A | 7/1990 | Kern | |
| 4,967,096 A | 10/1990 | Diemer et al. | |
| 5,013,929 A | 5/1991 | Dhyanchand | |
| 5,015,941 A * | 5/1991 | Dhyanchand | 322/10 |
| 5,023,537 A | 6/1991 | Baits | |
| 5,055,700 A | 10/1991 | Dhyanchand | |
| 5,068,590 A | 11/1991 | Glennon et al. | |
| 5,097,195 A | 3/1992 | Raad et al. | |
| 5,309,081 A * | 5/1994 | Shah et al. | 322/10 |
| 5,387,647 A | 2/1995 | Eichenauer et al. | |
| 6,188,204 B1 | 2/2001 | Vithayathil et al. | |
| 6,351,090 B1 | 2/2002 | Boyer et al. | |
| 6,838,779 B1 | 1/2005 | Kandil et al. | |
| 6,998,726 B2 | 2/2006 | Sarlioglu et al. | |
| 7,388,300 B2 * | 6/2008 | Anghel et al. | 290/39 |
| 7,508,086 B2 * | 3/2009 | Huang et al. | 290/31 |
| 7,687,928 B2 * | 3/2010 | Taneja et al. | 290/36 R |
| 2004/0183308 A1 | 9/2004 | Xu et al. | |

(Continued)

FOREIGN PATENT DOCUMENTS

EP   1289118 A1   3/2003

(Continued)

OTHER PUBLICATIONS

Search Report and Written Opinion from corresponding application PCT/US2010/029299, Jul. 14, 2011.

*Primary Examiner* — Quyen Leung
*Assistant Examiner* — Naishadh Desai
(74) *Attorney, Agent, or Firm* — David J. Clement, Esq.; Armstrong Teasdale LLP (57) ABSTRACT

A starting and generating system for use with an aircraft engine includes a starter/generator and an inverter/converter/controller (ICC) coupled to the starter/generator. The starter/generator is configured to start the aircraft engine in a start mode and to generate AC power in a generate mode. The starter/generator includes an exciter and a rotational shaft. The ICC is configured to provide AC power at a first frequency the starter/generator in the start mode and to control the exciter during the generate mode such that the generate mode AC power has a second frequency, wherein the first frequency is based on a shaft speed of the shaft.

18 Claims, 6 Drawing Sheets

U.S. PATENT DOCUMENTS

2006/0038405 A1 2/2006 Xu et al.
2006/0087293 A1 4/2006 Xu et al.
2006/0249956 A9 * 11/2006 Thomson et al. ............... 290/34
2007/0194572 A1 8/2007 Xu et al.

FOREIGN PATENT DOCUMENTS

EP 1826890 A2 8/2007
EP 2002115 A2 12/2008
WO 2007/111970 A2 10/2007

* cited by examiner

FIG. 6

AIRCRAFT ENGINE STARTING/GENERATING SYSTEM AND METHOD OF CONTROL

BACKGROUND OF THE INVENTION

The embodiments described herein relate generally to aircraft engines and, more particularly, to aircraft engine starting and power generating systems and methods of control.

At least some known starter/generator systems for use with aircraft are used to both start an aircraft engine in a start mode, and to utilize the aircraft engine after it has started to provide electrical energy to power systems on the aircraft in a generate mode. For example, at least some known systems include a starter/generator with two stator exciter windings and a variable-voltage, variable-frequency power converter that is alternately connected to drive a dynamoelectric machine as a starting motor or to receive power from the dynamic electric machine during generator operation. In at least some systems, one winding is a multi-phase AC winding for use in start mode, and one winding is a DC winding for use in generate mode. However, such systems include winding-selective circuitry that is heavy and expensive. Moreover, exciter stator utilization in such systems is poor, and the conversion circuitry is large.

Moreover, at least some known systems have an inability of a synchronous exciter to generate sufficient excitation power for a main synchronous machine in a starter/generator at zero or low speeds. For example, at least some known systems supply a DC voltage to an exciter winding of a conventional exciter during a generate mode and an AC voltage to the same winding during a start mode. However, such systems require an AC supply voltage to the exciter to be higher than a maximum voltage that a DC bus or DC link voltage at the input of the inverter can be inverted to, which requires additional circuitry to boost the DC bus or DC link voltage. As a consequence, the higher AC voltage makes such systems more prone to corona effects.

Furthermore, at least some known systems use AC excitation for both start mode and generate mode. Such systems generally include a multi-phase AC exciter that is controlled to operate at a high, constant frequency during start mode in order to generate the AC voltage in an exciter armature that is located on a shaft through a rotating transformer effect. The output of the armature is connected to a rotating rectifier that is located on the same shaft, and that outputs a desired DC voltage to power the excitation winding of a main machine. During generate mode, the frequency of the supplied AC voltage switches from a high, constant frequency to a low, constant frequency. The AC voltage in the armature is generated again through the rotating transformer effect, which provides the excitation power to the main generator through the rotating rectifier. To use AC excitation in both modes, a higher exciter current is generally used in generate mode when compared with the current for power-generation-only applications. This results in the requirement of a large, heavy converter. The high current may be avoided, but requires the introduction of additional winding selective circuitry for use in the start mode.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a starting and generating system is provided for use with an aircraft engine. The starting and generating system includes a starter/generator and an inverter/converter/controller (ICC) coupled to the starter/generator. The starter/generator is configured to start the aircraft engine in a start mode and to generate AC power in a generate mode. The starter/generator includes an exciter and a rotational shaft. The ICC is configured to provide AC power at a first frequency the starter/generator in the start mode and to control the exciter during the generate mode such that the generate mode AC power has a second frequency, wherein the first frequency is based on a shaft speed of the shaft.

In another aspect, a starting and generating system is provided for use with an aircraft engine. The starting and generating system includes a starter/generator and an inverter/converter/controller (ICC) coupled to the starter/generator. The starter/generator is configured to start the aircraft engine in a start mode and to generate AC power in a generate mode. The starter/generator includes an exciter and a rotational shaft. The ICC is configured to provide AC power at a first frequency to the starter/generator in the start mode and to control the exciter during the generate mode such that the generate mode AC power has a second frequency. The ICC includes a control board configured to control the ICC by determining the first frequency based on a shaft speed of the shaft.

In another aspect, a method is provided for controlling a starting and generating system for use with an aircraft engine. The starting and generating system includes a starter/generator that includes a rotational shaft. The starting and generating system also includes an inverter/converter/controller (ICC). The method includes providing, by the ICC, AC power at a first frequency to the starter/generator during a start mode, and starting the aircraft engine using the starter/generator, wherein the first frequency is a variable frequency based on a shaft speed of the shaft. The method also includes using the ICC, controlling the starter/generator during a generate mode to generate AC power at a second frequency.

BRIEF DESCRIPTION OF THE DRAWINGS

The embodiments described herein may be better understood by referring to the following description in conjunction with the accompanying drawings.

DETAILED DESCRIPTION OF THE INVENTION

Various embodiments of the present invention will be described in detail below, with reference to the accompanying drawings. The embodiments described herein relate to a bidirectional energy conversion, brushless, electric rotating device that converts electrical energy to mechanical energy in a start mode and mechanical energy to electrical energy in a generate mode.

Figure 1:
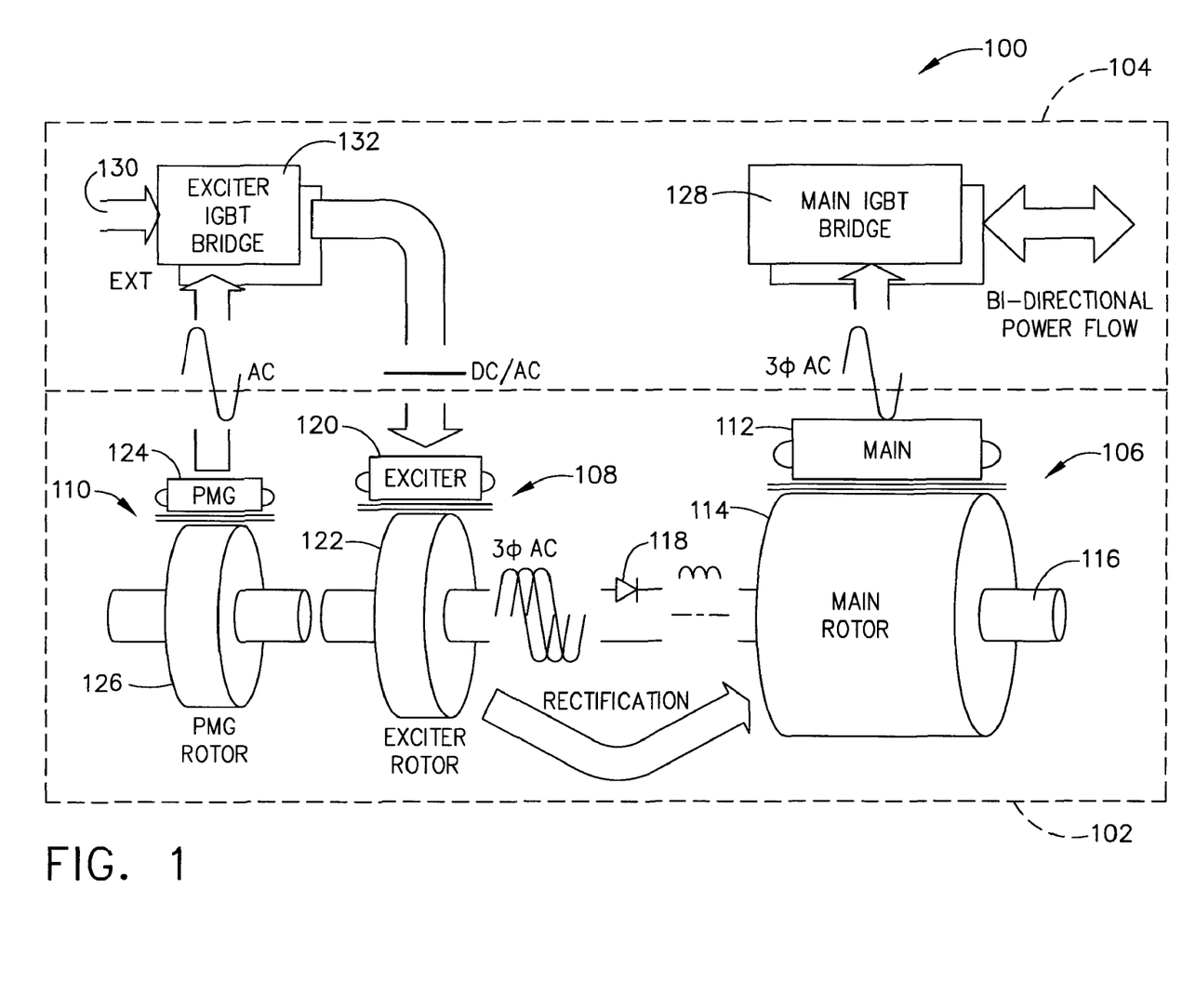
FIG. 1 is a schematic block diagram of an exemplary starting and generating system for use with an aircraft engine
Figure 2:
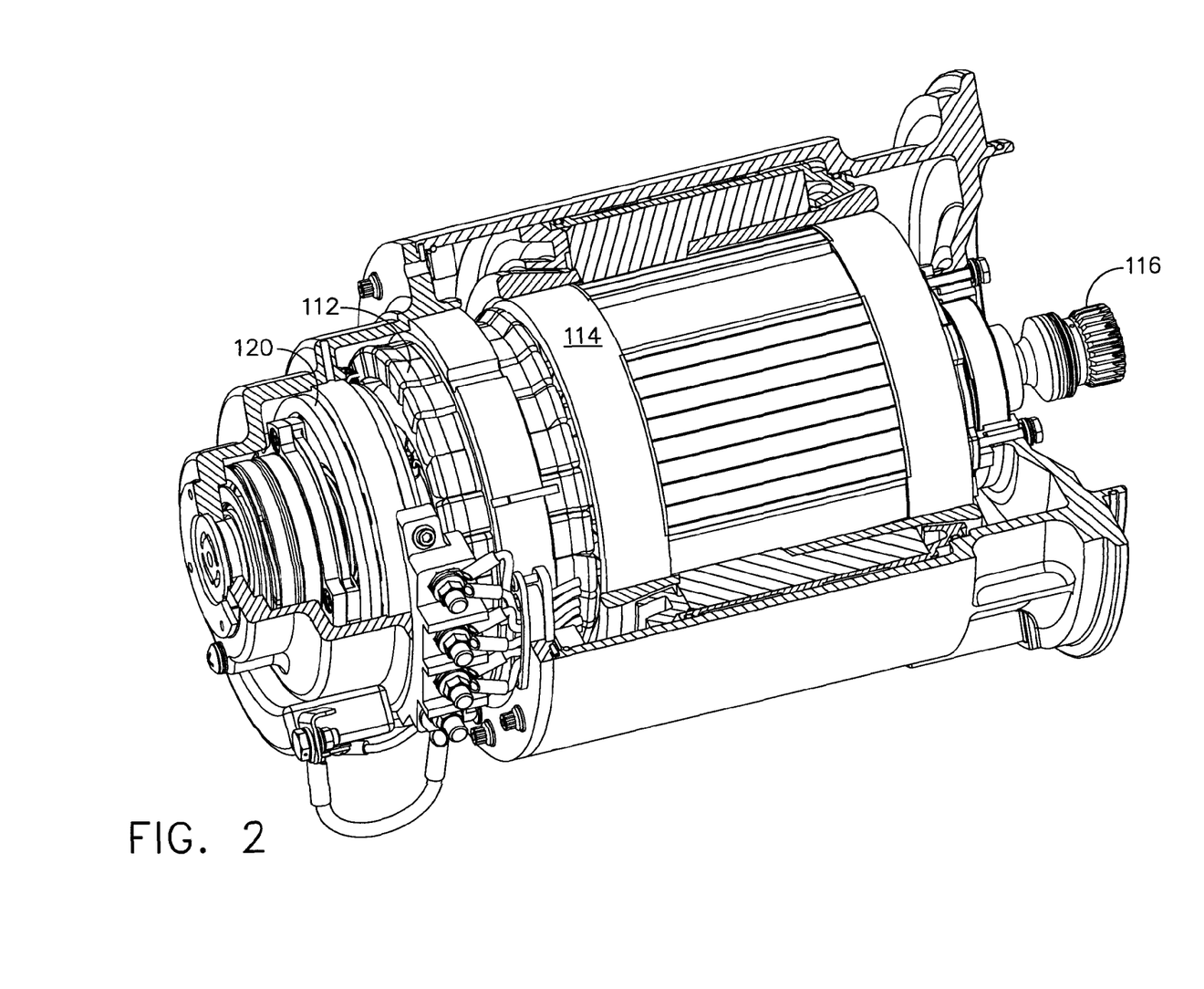
FIG. 2 is a sectional view of an exemplary starter/generator that may be used with the starting and generating system shown in FIG. 1.

FIG. 1 is a schematic block diagram of a starting and generating system 100 for use with an aircraft engine (not shown) in accordance with an exemplary embodiment of the invention. FIG. 2 is a sectional view of a starter/generator (S/G) 102 that may be used with system 100. In the exemplary embodiment, starting and generating system 100 includes S/G 102 and an inverter/converter/controller (ICC) 104 that is electrically coupled to S/G 102.

Referring to FIGS. 1 and 2, and in the exemplary embodiment, S/G 102 is configured to start the aircraft engine in a start mode and to generate AC power in a generate mode, as explained in greater detail below. Moreover, S/G 102 is a combination of three electric machines. Specifically, S/G 102 is a combination of a main machine 106, an exciter 108, and a permanent magnet generator (PMG) 110. This arrangement is referred generally to as a three-machine set. In one embodiment, main machine 106 is a salient synchronous machine. In the exemplary embodiment, main machine 106 includes a main stator 112 and a main rotor 114. Main rotor 114 includes a shaft 116 extending therethrough, and a rotating rectifier 118 having an output (not shown) that is electrically coupled to main rotor 114. In the exemplary embodiment, rectifier 118 is positioned inside shaft 116. However, rectifier 118 may be positioned differently with respect to shaft 116 in other embodiments. Further, in one embodiment, rectifier 118 is a full-wave rotating rectifier. In another embodiment, rectifier 118 is a half-wave rotating rectifier. In the exemplary embodiment, main stator 112 includes a 3-phase AC winding (not shown in FIGS. 1 and 2). Alternative embodiments may include any suitable winding such as, but not limited to, a 6-phase AC winding, a 9-phase AC winding, and the like. Moreover, in the exemplary embodiment, exciter 108 includes an exciter stator 120 and an exciter rotor 122. Exciter stator 120 includes a first 3-phase AC winding (not shown in FIGS. 1 and 2), and exciter rotor 122 includes a second 3-phase AC winding (not shown in FIGS. 1 and 2) that is coupled to an input (not shown) of rectifier 118. Moreover, permanent magnet generator (PMG) 110 includes a PMG stator 124 and a PMG rotor 126.

Referring to FIG. 1, ICC 104 provides AC power to S/G 102 at a first frequency in the start mode, and controls S/G 102 during the generate mode to generate AC power at a second frequency that is less than the first frequency. The first frequency is variable and is based on a shaft speed of shaft 116. The second frequency is substantially constant and is less than the first frequency to minimize power transferred from exciter stator 120 while still enabling exciter 108 to be appropriately controlled, as explained below in greater detail. Moreover, in the exemplary embodiment, ICC 104 includes a main bridge 128 that is electrically coupled to main stator 112 and to electrical systems (not shown) within the aircraft. ICC 104 also includes an exciter bridge 132 that is electrically coupled to exciter stator 122 and to an external power source 130. More specifically, exciter bridge 132 is electrically coupled to the first AC winding. Exciter bridge 132 is also electrically coupled to PMG stator 124. In the exemplary embodiment, main bridge 128 is an insulated-gate bipolar transistor (IGBT)/diode bridge. However, alternative embodiments may use any suitable bridge. In the exemplary embodiment, exciter bridge 132 is also an IGTB/diode bridge. In an alternative embodiment, exciter bridge 132 is a metal-oxide-semiconductor field-effect transistor (MOSFET) bridge. In another alternative embodiment, exciter bridge 132 is a silicon carbide (SiC) MOSFET bridge. However, further alternative embodiments may use any suitable bridge. In the following description, main bridge 128 and exciter bridge 132 may be interchangeably referred to as a main inverter/converter and an exciter inverter/converter, respectively.

Figure 3:
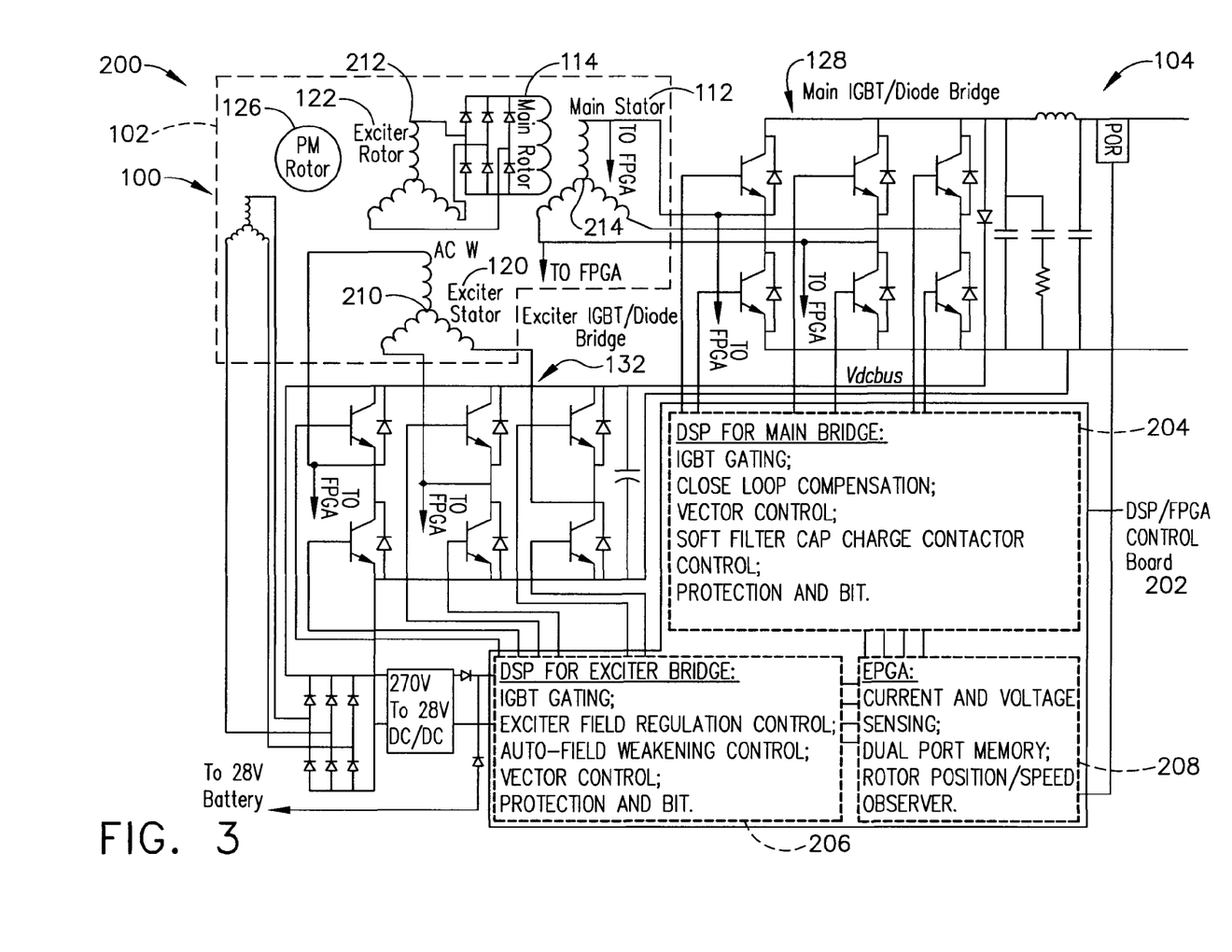
FIG. 3 is a block schematic diagram of an exemplary electrical architecture of the starting and generating system shown in FIG. 1.

FIG. 3 is a block schematic diagram of an electrical architecture 200 of starting and generating system 100. More specifically, FIG. 3 shows system 100 with an emphasis on components that make up main bridge 124 and exciter bridge 132. In the exemplary embodiment, ICC 104 also includes a control board 202 that is electrically coupled to both main bridge 128 and exciter bridge 132. Control board 202 includes a main bridge digital signal processor (DSP) 204, an exciter bridge DSP 206, and a field-programmable gate array (FPGA) 208. A first AC exciter winding 210, coupled to exciter stator 120, is electrically coupled to FPGA 208 and exciter bridge 132. A second AC exciter winding 212, coupled to exciter rotor 122, is electrically coupled to main rotor 114. A main stator AC winding 214 is electrically coupled to FPGA 208. When in use during the start mode of system 100, main bridge DSP 204 may be interchangeably referred to herein as a starter inverter controller or a starter inverter DSP. When in use during the generate mode of system 100, main bridge DSP may be interchangeably referred to herein as a generator converter controller or a generator converter DSP. Moreover, when in use during the start mode of system 100, exciter bridge DSP 206 may be interchangeably referred to herein as an exciter inverter controller or an exciter inverter DSP. When in use during the generate mode of system 100, exciter bridge DSP 206 may be interchangeably referred to herein as exciter converter controller or exciter converter DSP. Main bridge DSP 204 is operatively coupled to main bridge 128 and includes embedded software for controlling main bridge 128. Specifically, main bridge DSP 204 controls main bridge 128 in the start mode of system 100 to generate AC power to drive S/G 102. Moreover, main bridge DSP 204 controls main bridge 128 in the generate mode of system 100 to convert AC power to DC power for use by other components (not shown) of an aircraft.

Figure 4:
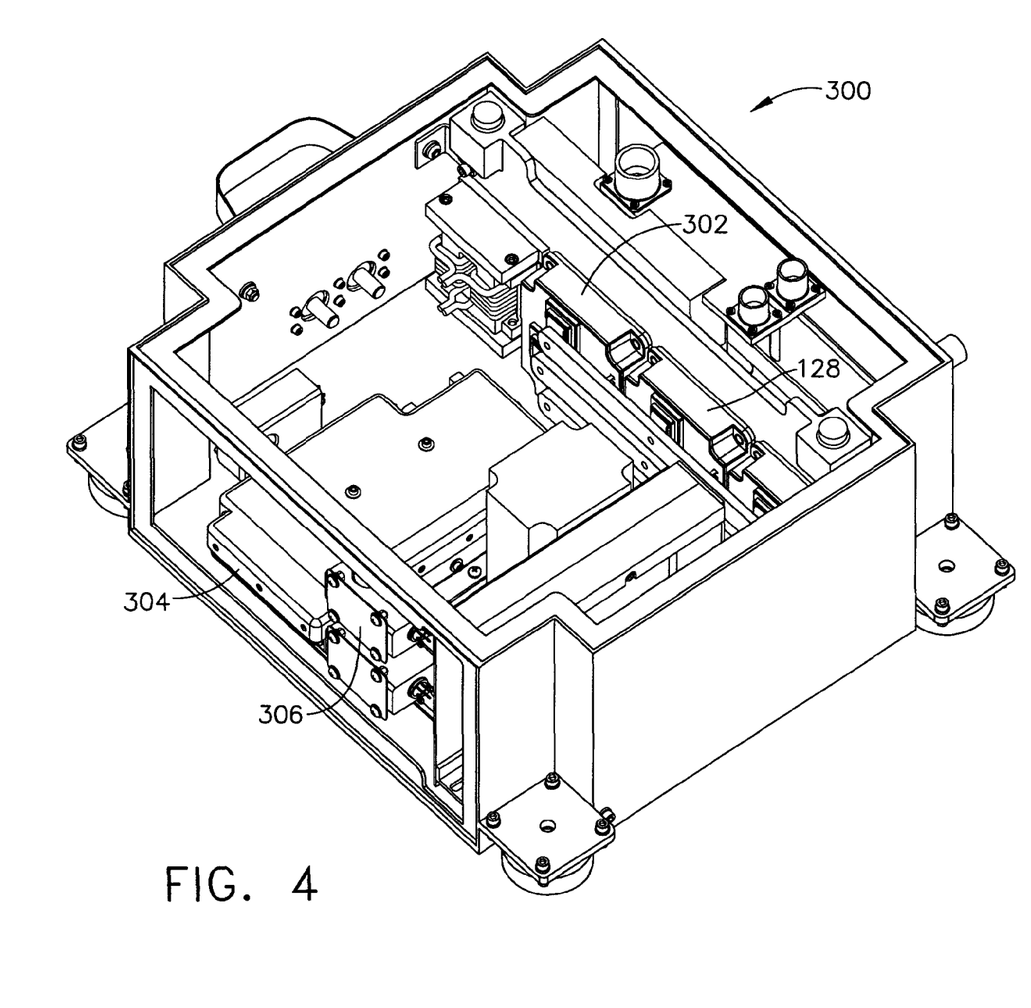
FIG. 4 is a first isometric view of an exemplary housing that may be used with the starting and generating system shown in FIG. 1.
Figure 5:
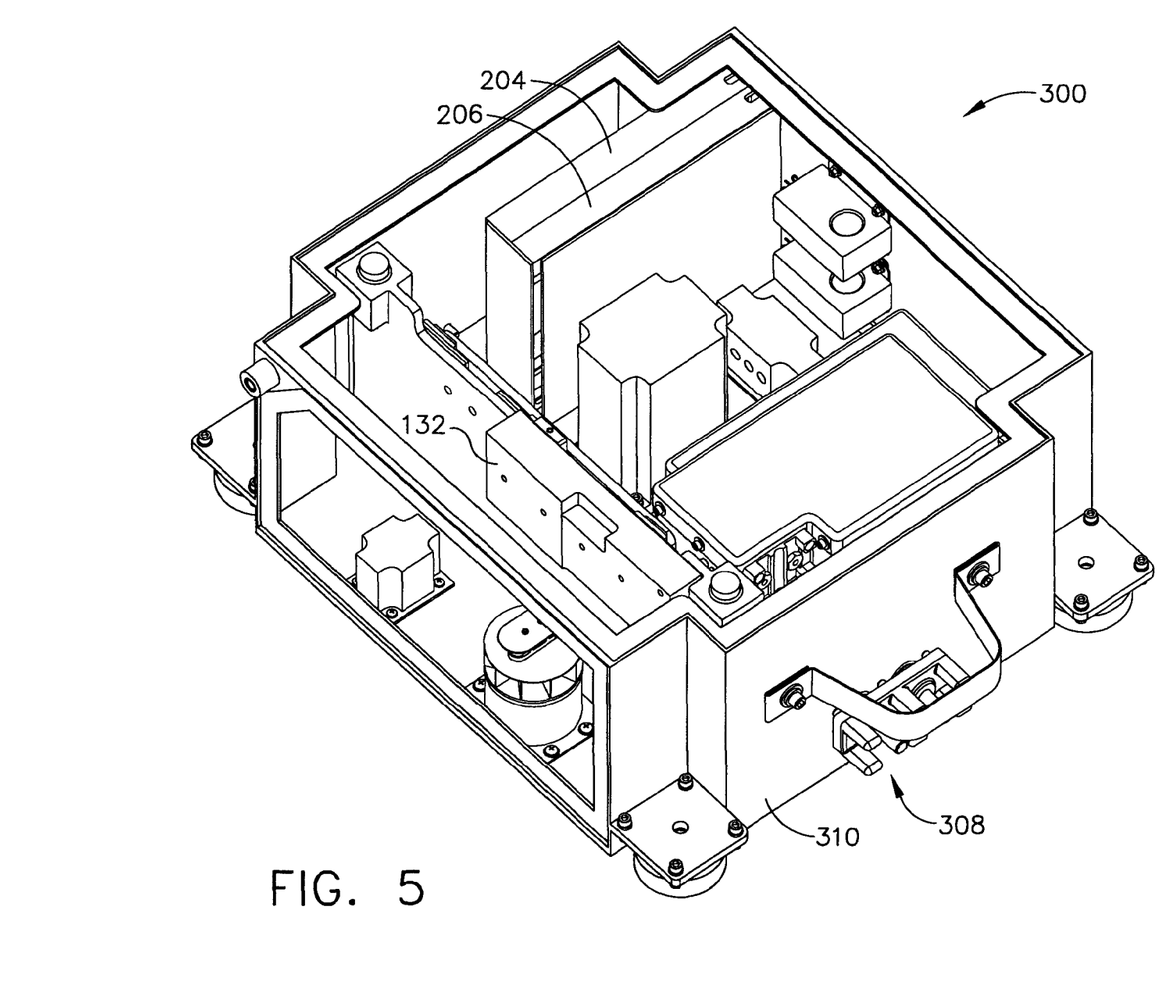
FIG. 5 is a second isometric view of the housing shown in FIG. 4.

FIGS. 4 and 5 are isometric views of ICC 104 (shown in FIGS. 1 and 3), as it may be packaged in a housing 300 that is sized to be inserted into or mounted onto a cabinet (not shown) within an aircraft (not shown). In the exemplary embodiment, housing 300 is sized to contain a cold plate 302 that facilitates heat dissipation and/or heat removal from ICC 104. Housing 300 also contains main bridge 128, exciter bridge 132, main bridge DSP 204, exciter bridge DSP 206, and FPGA 208. Moreover, housing 300 contains a filter cap assembly 304 and one or more sense assemblies 306. An output voltage terminal block 308 is coupled on an outer surface 310 of housing 300 to provide DC power to other components (not shown) within the aircraft.

During use, and referring to FIGS. 1-5, starting and generating system 100 has two operating modes: a start mode and a generate mode. In the generate mode, 3-phase exciter AC winding 212 generates the necessary rotating field in an air gap (not shown) between exciter rotor 122 and exciter stator 120. The rotating magnetic field interacting with first AC exciter winding 210 generates a voltage in first AC exciter winding 210. Additionally, 3-phase AC winding 210 transfers electromagnetic power from exciter stator 120 to exciter rotor 122 during the start mode. More specifically, exciter stator 120 is optimally constructed for a power generating operation in terms of a number of turns per phase and magnetic circuitry (not shown) because system 100 spends a majority of its operational time in the generate mode. A current of exciter stator winding 210 is thus minimized to a low level and may still be appropriately controlled. Moreover, exciter bridge DSP 206 controls exciter stator 120 such that the direction of the rotating field in the air gap in exciter 108 is opposite from the rotating direction of shaft 116, thus forcing exciter 108 to function as an induction machine in its braking mode. While an induction machine works in its braking mode, power at the output of an armature is the summation of two terms: $P_S$ and $P_m=(1-S)P_S$, where $P_S$ is the electrical power transferred from exciter stator 120, $P_m$ is the mechanical power converted from mechanical power on shaft 116, and S is the slip, which is a difference between a speed of the stator field and the rotor speed. In addition, S is defined by Equation (1) as follows:

$$S = \frac{\omega_S - \omega}{\omega_S} \qquad \text{Eq. (1)}$$

where $\omega_S=2\pi f_S$ and $\omega=2\pi f$. Further, $f_S$ is a frequency of an AC voltage supplied by exciter bridge 132 and is defined by Equation (2) as follows:

$$f = \frac{RPM \cdot P}{120} \qquad \text{Eq. (2)}$$

where RPM is a shaft speed and P is a number of poles of exciter 108. Furthermore, making the frequency of the AC exciter supply voltage generated by exciter bridge 132 substantially constant and reasonably small facilitates minimizing the power transferred from exciter stator 120 while still enabling exciter 108 to be appropriately controlled. For example, for an exciter 108 having eight poles and running at approximately 12,000 revolutions per minute (RPM) in a direction opposite that of the rotating field generated by an approximately 5 Hertz (Hz) AC voltage that is supplied at an input (not shown) of exciter stator winding 210 by exciter bridge 132, RPM=−12000 and P=8. Using the equations above, it can be shown that:

$$\omega = 2\pi f = 2\pi\left(\frac{-12000 \cdot 8}{120}\right) = -2\pi \cdot 800$$

wherein the negative f indicates that exciter rotor 122 is running in an opposite direction than the rotating field in the air gap. Then, $$S = \frac{2\pi \cdot 5 + 2\pi \cdot 800}{2\pi \cdot 5} = 161.$$

Therefore, the power ratio between $P_S$ and $P_m$ as shown below indicates that the majority of the power output from rotating rectifier 118 to exciter rotor winding 212 comes from the mechanical power transferred through shaft 116. The power from exciter stator 120 crossing the exciter air gap is also very small. Thus, the physical size of exciter bridge 132 may be minimized.

$$\frac{P_S}{P_m} = \frac{1}{|1-S|} = \frac{1}{160} = 0.63\%$$

In the start mode, system 100 receives electrical power from external power source 130. Main machine 106 operates as a 3-phase wound field salient synchronous motor in the start mode. 3-phase alternating current is supplied to 3-phase main stator winding 214 from main bridge 128, and an excitation current is provided to main rotor 114 from exciter 108. The frequency of the current supplied to main stator 112 is proportional to a speed of main machine 106. A rotating field generated by the 3-phase current interacts with a magnetic field generated by main rotor 114 to create mechanical torque at shaft 116 of main rotor 114. As such, in start mode, exciter stator 120 with 3-phase AC winding 210 and exciter rotor 122 with 3-phase AC winding 212 together form an induction exciter. Exciter bridge DSP 206 controls a direction of a phase sequence of the 3-phase AC windings 210 and 212 such that the direction is opposite from the rotational direction of shaft 116. Thus, the induction exciter operates in its braking mode. Consequently, the power transferred from exciter stator 120 may be minimized. Further, the frequency of the supply voltage of exciter 108 is controlled in such a way that both the magnitude and the frequency of the supply voltage applied to exciter 108 are reduced along with the speed of shaft 116. Because the design of exciter stator 120 is optimized for generate mode, the number of turns per phase is relatively high, which requires a higher supply voltage as the shaft speed increases. When this occurs, the frequency is reduced as the speed increases to avoid a higher voltage demand.

Figure 6:
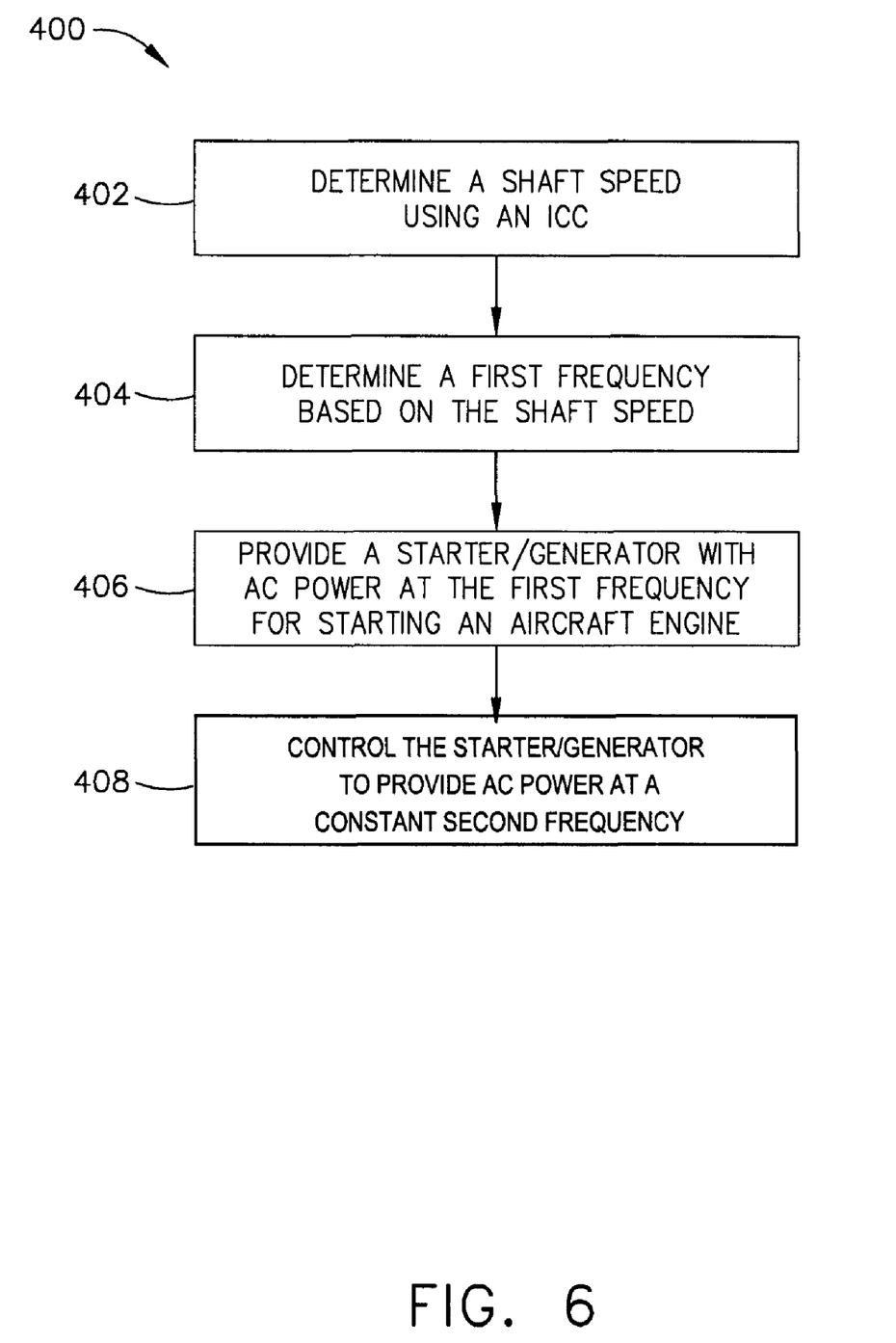
FIG. 6 is a flowchart illustrating an exemplary method of assembling the starting and generating system shown in FIG. 1.

FIG. 6 is a flowchart 400 illustrating an exemplary method of controlling a starting and generating system, such as starting and generating system 100 (shown in FIG. 1), for use with an aircraft engine (not shown). Referring to FIGS. 1-5, and in the exemplary embodiment, a shaft speed of shaft 116 (shown in FIG. 1) is determined 402 using ICC 104 (shown in FIG. 1). Specifically, control board 202 (shown in FIG. 3) determines the shaft speed of shaft 116. ICC 104 then determines 404 a desired first frequency for use in a start mode. Specifically, control board 202 determines the first frequency based on the shaft speed in order to avoid a high supply voltage demand during start mode. In order to start the aircraft engine (not shown), ICC 104 provides 406 S/G 102 (shown in FIG. 1) with AC power at the first frequency. Specifically, rectifier 118 (shown in FIG. 1) provides the AC power a the first frequency to exciter stator winding 210 (shown in FIG. 3). Exciter 108 (shown in FIG. 1) uses the AC power to provide excitation to main rotor 114 to start the aircraft engine.

Moreover, in the exemplary embodiment, after the aircraft engine has been started, S/G 102 provides AC power at a second frequency for use in powering onboard electrical systems (not shown) within the aircraft during a generate mode. The second frequency is substantially constant and is less than the first, variable, frequency. ICC 104 controls 408 main machine 106 (shown in FIG. 1) during the generate mode such that main machine 106 provides the onboard electrical systems with power.

Embodiments of starting and generating systems for use with aircraft engines, and methods of control, are described in detail herein. Such systems facilitate providing fuel savings benefits via weight reduction and electrical power system optimization. Moreover, optimizing an excitation performance during both start and generate modes of such systems facilitates eliminating additional complexity, weight, size, and cost to produce and maintain such systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A starting and generating system for use with an aircraft engine, said starting and generating system comprising:
   a starter/generator configured to start the aircraft engine in a start mode and to generate AC power in a generate mode, said starter/generator comprising an exciter and a rotational shaft; and
   an inverter/converter/controller (ICC) coupled to said starter/generator, said ICC configured to provide AC power at a first frequency to said starter/generator in the start mode and to control said exciter during the generate mode such that the generate mode AC power has a second frequency, wherein the first frequency is based on a shaft speed of said shaft and wherein the second frequency is substantially constant and less than the first frequency.

2. A starting and generating system in accordance with claim 1, wherein said starter/generator further comprises:
   a main machine comprising a main stator and a main rotor; and
   a permanent magnet generator (PMG) comprising a PMG stator and a PMG rotor.

3. A starting and generating system in accordance with claim 2, wherein said ICC comprises a main IGBT bridge coupled to said main stator, said main machine configured to generate AC power at the second frequency during the generate mode.

4. A starting and generating system in accordance with claim 3, wherein said ICC comprises an exciter bridge coupled to said exciter stator, said exciter bridge configured to control said exciter such that said exciter operates as a braking mode induction machine.

5. A starting and generating system in accordance with claim 4, wherein said exciter bridge comprises one of an IGBT bridge, a MOSFET bridge, and an SiC MOSFET bridge.

6. A starting and generating system in accordance with claim 4, wherein said exciter bridge is configured to generate a variable AC exciter supply voltage.

7. A starting and generating system in accordance with claim 1, wherein said exciter comprises an exciter stator and an exciter rotor, said exciter stator comprising an AC winding, and wherein said ICC comprises an exciter bridge configured to provide the AC power at the first frequency to said winding.

8. A starting and generating system for use with an aircraft engine, said starting and generating system comprising:
   a starter/generator configured to start the aircraft engine in a start mode and to generate AC power in a generate mode, said starter/generator comprising an exciter and a rotational shaft;
   an inverter/converter/controller (ICC) coupled to said starter/generator, said ICC configured to provide AC power at a first frequency to said starter/generator in the start mode and to control said exciter during the generate mode such that the generate mode AC power has a second frequency, said ICC comprising a control board configured to control said ICC by determining the first frequency based on a shaft speed of said shaft and wherein the second frequency is substantially constant and less than the first frequency.

9. A starting and generating system in accordance with claim 8, wherein said starter/generator further comprises:
   a main machine comprising a main stator and a main rotor; and
   a permanent magnet generator (PMG) comprising a PMG stator and a PMG rotor.

10. A starting and generating system in accordance with claim 9, wherein said ICC further comprises a main IGBT bridge coupled to said main stator, said main machine configured to generate AC power at the second frequency during the generate mode.

11. A starting and generating system in accordance with claim 10, wherein said ICC comprises an exciter bridge coupled to said exciter stator, said exciter bridge configured to control said exciter such that said exciter operates as a braking mode induction machine.

12. A starting and generating system in accordance with claim 11, wherein said exciter bridge comprises one of an IGBT bridge, a MOSFET bridge, and an SiC MOSFET bridge.

13. A starting and generating system in accordance with claim 11, wherein said exciter bridge is configured to generate a variable AC exciter supply voltage.

14. A starting and generating system in accordance with claim 8, wherein said exciter comprise an exciter stator comprising an AC winding, and wherein said ICC comprises an exciter bridge configured to provide the AC power at the first frequency to said winding.

15. A method of controlling a starting and generating system for use with an aircraft engine, the starting and generating system including a starter/generator and an inverter/converter/controller (ICC), the starter/generator including a rotational shaft, said method comprising:
   providing, by the ICC, AC power at a first frequency to the starter/generator during a start mode, wherein the first frequency is a variable frequency based on a shaft speed of the shaft;
   starting the aircraft engine using the starter/generator; and
   using the ICC, controlling the starter/generator during a generate mode to generate AC power at a second frequency and wherein the second frequency is substantially constant and less than the first frequency.

16. A method in accordance with claim 15, wherein the starter/generator includes an exciter having at least one AC winding and the ICC includes an exciter bridge, and wherein providing AC power at a first frequency to the starter generator during a start mode comprises:
   determining the shaft speed;
   determining the first frequency based on the shaft speed; and
   providing AC power to the at least one AC winding at the first frequency.

17. A method in accordance with claim 16, wherein providing AC power to the at least one AC winding comprises generating a variable AC exciter supply voltage using the exciter bridge.

18. A method in accordance with claim 15, further comprising generating AC power during the generate mode at the second frequency using the main machine.

* * * * *